Jan. 13, 1953 B. ROBERTS 2,625,611

MAGNETIC RECORDING AND REPRODUCING APPARATUS
COMBINED WITH DISK REPRODUCER

Filed Dec. 11, 1946 5 Sheets-Sheet 1

INVENTOR
Bruce Roberts
BY
Synnestvedt & Lechner
ATTORNEYS

Jan. 13, 1953 B. ROBERTS 2,625,611

MAGNETIC RECORDING AND REPRODUCING APPARATUS COMBINED WITH DISK REPRODUCER

Filed Dec. 11, 1946 5 Sheets-Sheet 2

INVENTOR
Bruce Roberts
BY Synnestvedt & Lechner
ATTORNEYS

Jan. 13, 1953 B. ROBERTS 2,625,611

MAGNETIC RECORDING AND REPRODUCING APPARATUS COMBINED WITH DISK REPRODUCER

Filed Dec. 11, 1946 5 Sheets-Sheet 3

INVENTOR
Bruce Roberts
BY Synnestvedt & Lechner
ATTORNEYS

INVENTOR
Bruce Roberts
BY Synnestvedt & Lechner
ATTORNEYS

Jan. 13, 1953 B. ROBERTS 2,625,611

MAGNETIC RECORDING AND REPRODUCING APPARATUS
COMBINED WITH DISK REPRODUCER

Filed Dec. 11, 1946 5 Sheets-Sheet 5

INVENTOR
Bruce Roberts
BY
Synnestvedt & Lechner
ATTORNEYS

Patented Jan. 13, 1953

2,625,611

UNITED STATES PATENT OFFICE 2,625,611

MAGNETIC RECORDING AND REPRODUCING APPARATUS COMBINED WITH DISK REPRODUCERS

Bruce Roberts, Philadelphia, Pa., assignor to The International Electronics Company, Philadelphia, Pa., a corporation of Pennsylvania Application December 11, 1946, Serial No. 715,518

16 Claims. (Cl. 179—100.1)

This invention relates to apparatus for the production and reproduction of recordings on magnetic tape.

It is well known that intelligence may be recorded upon steel wire or upon paper which has been coated with a magnetizable material, and that by this means recordings of relatively much greater length may be made than are possible within the limitations of phonograph records of reasonable size.

A general object of the present invention is an apparatus for producing magnetic tape recordings from a plurality of sources, including a disc record player incorporated therein.

Another object of the invention is to provide, in combination, means for reproducing alternatively either disc recordings or magnetic tape recordings.

A further object of the invention is a highly novel means for translating magnetic tape in relation to a magnetic recording or reproducing head.

A still further object of the invention is the provision of novel drive means for a magnetic tape translating device associated with a phonograph turntable.

Yet another object of the invention is an apparatus capable of producing or reproducing on a continuous length of tape magnetic recordings, portions of which are recorded in opposite directions.

Beyond the foregoing, the invention contemplates a novel means for controlling in coordination reversing the tape-translating means and reorientation of the recording head means in relation to the tape.

How the foregoing and other objects are attained will appear more clearly upon consideration of the description hereinbelow and the attached drawings, in which.

It is contemplated that the device of this invention may be used in conjunction with the radio frequency tuner, audio amplifier, loudspeaker, and cabinet of a conventional radio set, and that the present invention will enjoy the same physical relationship to such set as does a conventional disc record player. It is to be understood, however, that the specific nature of the radio set forms no part of the present invention, and that the invention is not limited to operation in conjunction with such a set, but may be used in connection with a separate amplifier and loudspeaker, as will be clearly understood by those skilled in the art.

Figure 1:
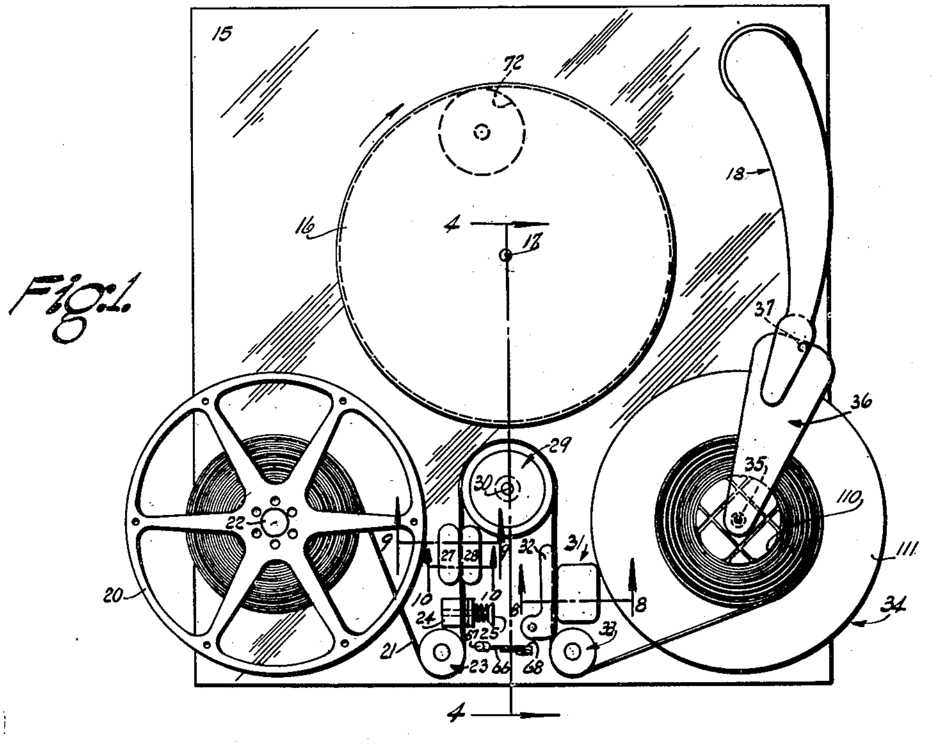
Figure 1 is a plan view of my novel combination disc and tape recording device, showing the relative positions of the phonograph turntable, pick up, tape reels, and my new tape-translating system.

Turning now to the drawings, it will be seen in Figure 1 that mounted on a top deck 15 is a phonograph turntable 16, having a shaft 17. The turntable is driven through a drive puck 72 (shown in dotted outline), by an electric motor not visible in this view.

Adjacent the turntable, a tape storage reel 20, on which is wound a portion of the tape 21, is mounted for rotation with shaft 22. The tape 21 passes around idler 23, through perforator 24, thence between contact housings 27 and 28 and around tape-driving capstan 29, which is mounted for rotation on shaft 30. The tape then passes between head housing 31 and tape latch 32, around pulley 33 and thence onto reel 34, which is mounted for rotation on shaft indicated in dotted outline at 35. Reel 20 may be a conventional motion picture film reel. The invention contemplates that tapes may be stored on such reels and that reels containing tape will be inserted as a unit into the machine.

Reel 34, which is a permanent part of the apparatus, comprises a central core 110 and a bottom tape guide of circular form 111, secured to the core for rotation therewith. Reel 34 is also provided with a non-rotative tape guide 36 swingably mounted on base plate 15 as indicated at 37. Although the tape has been described as feeding from reel 20 to reel 34, it should be understood that the tape drive mechanism is reversible, as will appear hereinbelow.

Figure 4:
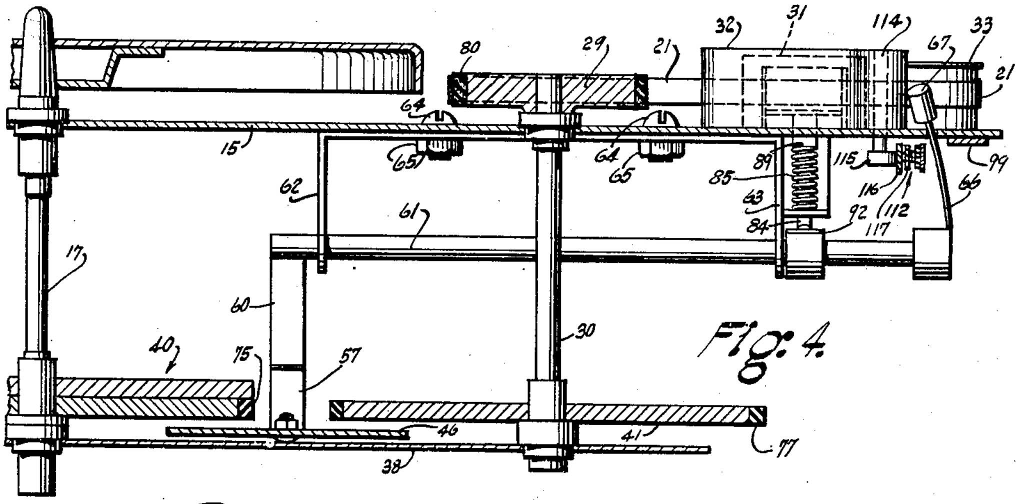
Figure 4 is also a vertical sectional view on an enlarged scale, taken along the line 4—4 in Figure 1.

It should be noted that the various portions of the tape-translating mechanism, including the reels and the capstan 29, are mounted below the plane of the top surface of turntable 16, as may be seen in Figure 4. This orientation permits the tape-translating mechanism to be mounted comparatively close to the turntable 16 without regard to the size of the disc records which may be employed in conjunction therewith. For example, it is contemplated that a standard 12'' disc record will overlie at least a part of the tape-translating mechanism.

In connection with the tape-translating mechanism, it should further be noted that the tape path is defined exclusively by the idler pulleys 23 and 33 and capstan 29, the runs between the two idlers and the capstan being substantially parallel, and the tape being in contact with the capstan throughout approximately 180° of arc. By this arrangement, two advantages are achieved. First, the tape runs between the pulleys and the capstan are unaffected by the extent of winding or unwinding of tape from the reels 20 and 34, and, second, the comparatively large area of contact between the tape and the capstan insures extended frictional engagement, and makes for highly uniform translation of the tape. As will be discussed more fully hereinbelow, the drive to the capstan and the drive to whichever reel is winding at a given moment is such that more slippage is incorporated in the drive to the reel, whereby the speed of the capstan establishes the speed of the tape, and the reel speed is permitted to adjust itself in proportion to the amount of tape laid up on the reel, and yet maintain tension on the tape in its run from the capstan to the reel in question.

According to the invention, those parts of the mechanism which operate in conjunction with the moving tape are disposed along one or the other of the straight runs of the tape between the idler pulleys and the capstan. For example, the recording head 81 is mounted in housing 31 in juxtaposition to the run of tape between idler pulley 33 and capstan 29. On the opposite side of the same run of the tape is tape latch 32, which may be seen in plan in Figure 1 and in section in Figure 8, which serves the function of maintaining the tape against the pole pieces diagrammatically indicated at 90 and 91 of a suitable recording head 81. This latch also doubles as a manual power switch, as will appear more fully hereinbelow. Disposed along the run of the tape between idler pulley 23 and capstan 29 is to be seen a perforator 24, having a plunger 25. This device functions in the manner of a simple punch, being arranged to produce a hole in the tape when the plunger 25 is depressed. Along the same run of tape is a pair of switches mounted in housings 27 and 28. The first of these may be seen in section in Figure 9. This is the automatic shutoff switch for the driving motor. Immediately adjacent thereto is the automatic reversing switch which is arranged to respond to the presence of a perforation of the sort produced upon the operation of perforator 24 (see Figure 10).

Figure 2:
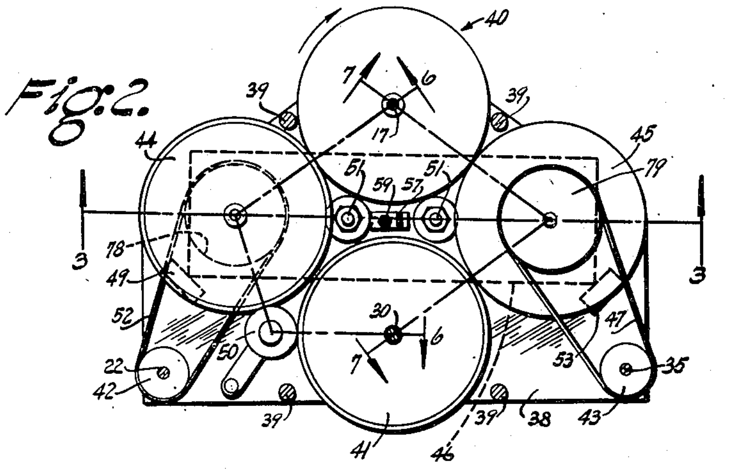
Figure 2 is a view of the device with the upper deck removed, taken in the plane represented by line 2—2 in Figure 3, and showing the drive means for my novel tape-translating system.

Turning now to the drive mechanism, reference should first be had to Figure 2, which represents the parts lying below top deck 15. These parts are mounted on lower deck 38 which is secured to top deck 15 by spacers 39. It should first be pointed out that drive disc 40 is mounted for rotation with turntable shaft 17, that driven disc 41 is mounted for rotation with capstan shaft 30, and that pulleys 42 and 43 are mounted on reel shafts 22 and 35 respectively. When the turntable 16 is driven clockwise, therefore, disc 40 will also rotate clockwise. Intermediate discs 44 and 45 are rotatably mounted on a plate 46 which is loosely mounted on lower deck 38 by bolts 51 passing through oversize holes 38a in deck 38, and may be moved in a sense substantially coincident with line 3—3 in Figure 2, bringing the discs alternately into peripheral engagement with disc 40. Secured to intermediate discs 44 and 45, respectively, are reel driving pulleys 78 and 79. Thus, when the plate 46 is moved to the left, disc 45 will come into peripheral contact with disc 40 and also with disc 41, as a result of which disc 41 will be driven in the same direction as disc 40, that is to say, clockwise. At the same time, pulley 43 will be driven counter-clockwise by belt 47 and as a result tape reel 35 will also rotate counterclockwise and take up the slack in the tape between capstan 30 and reel 34.

Figure 5:
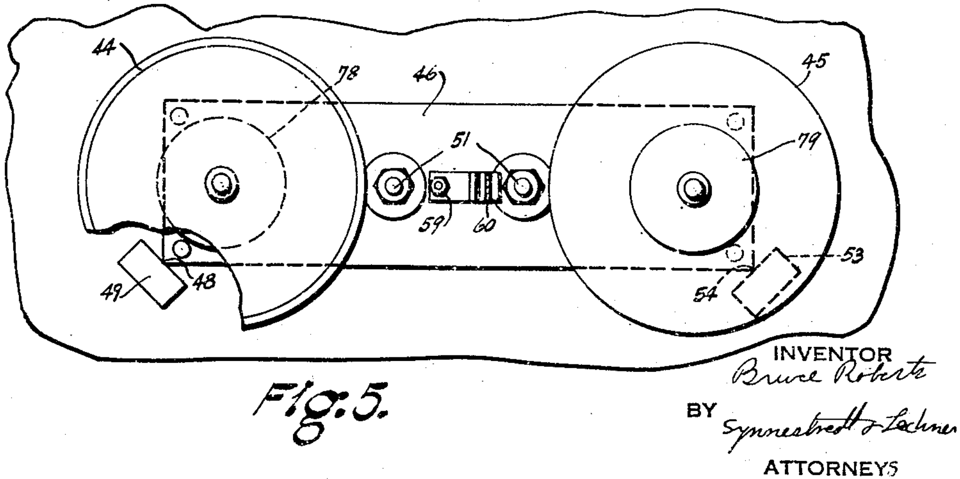
Figure 5 is a fragmentary view, partly in plan and partly broken, of the central portion of Figure 2.

It should be noted that belts 47 and 52 are elastic in order to permit movement of intermediate discs 44 and 45. The elasticity of these belts results in the imposition of torque moments on the ends of plate 46, which tend to constrain the plate in the direction of driven disc 41. The tension of these belts, therefore, tends to maintain the intermediate discs in contact with the driven member or idler disc when one or the other of the intermediate discs is in driving position, but it is necessary to counteract the torque moment on the intermediate disc which is out of engagement at a given moment. How this is accomplished will be seen upon reference to Figure 5. When plate 46 is moved to the left, the lower left-hand corner 48 abuts upon guide plate 49 and is deflected away from idler 50 (Figure 2) which is spring-held against disc 41. As a result, disc 44 is dissociated from disc 40 as well as from disc 41.

Now, if the plate 46 be moved to the opposite extreme of its motion, that is, to the right, disc 45 will be moved out of engagement with disc 40 and by the intermediation of guide plate 53, corner 54 of plate 46 will be deflected upward and disc 45 will move out of engagement with driven disc 41. Simultaneously, disc 44 will come into peripheral engagement with disc 40 and idler 50, with the result that disc 41 will now be driven through the train 40, 44 and 50, and hence will rotate in a counter-clockwise direction, that is, opposite to disc 40. As a result, capstan 29 will also rotate in a counter-clockwise direction, pulling tape from reel 34 which is now a part of a free running system including the reel 34, pulley 35 and intermediate disc 45. Tape reel 20 is now driven by intermediate disc 44, which is rotating counter-clockwise, through belt 52 and pulley 42, and thereby is enabled to take up the slack in the tape created by capstan 29.

It should be noted that at the relatively slow speeds at which the tape translating mechanism operates, the frictional losses in the free running system comprising the unwinding reel, its pulley, and the intermediate disc beltably connected therewith, are sufficient to prevent overspeeding of the unwinding reel and hence obviate the necessity for a separate brake to retard the rotation of a reel during the unwinding phase.

Figure 3:
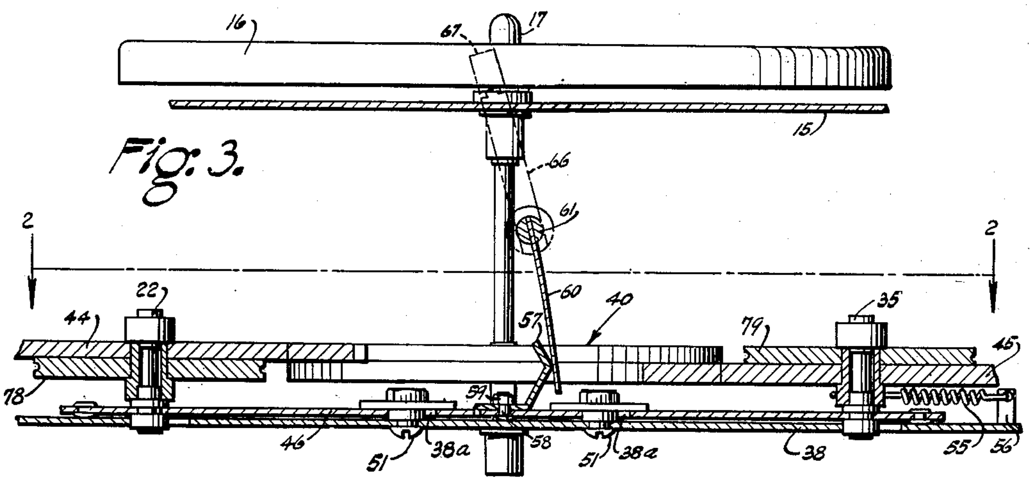
Figure 3 is a vertical sectional view on an enlarged scale, taken along the line 3—3 in Figure 2.
Figures 9, 10, 11:
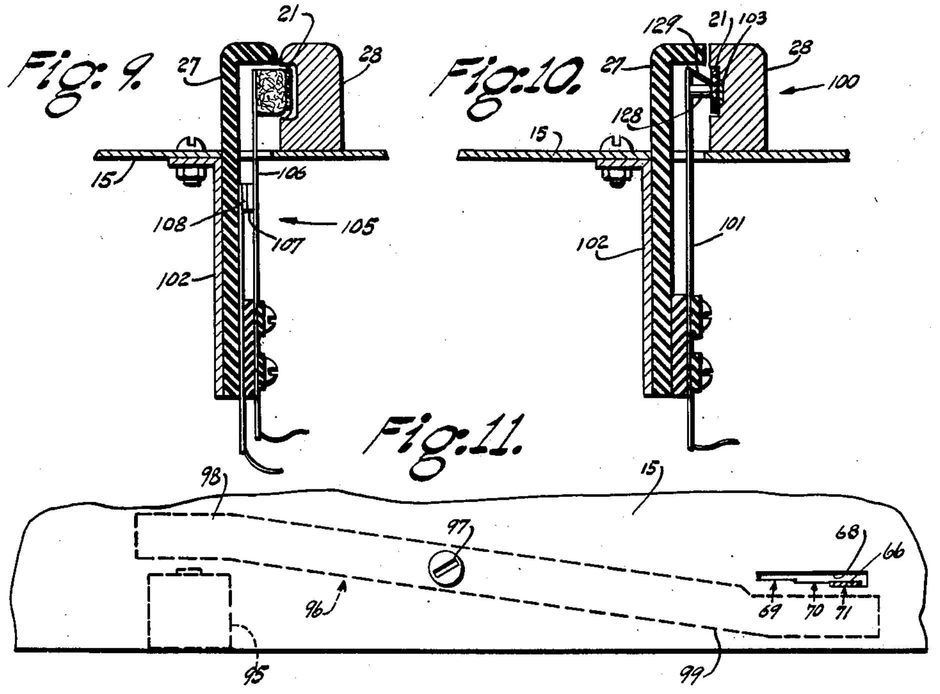
Figure 9 is a vertical sectional view taken along the line 9—9 in Figure 1, and shows the automatic power switch.
Figure 10 is a vertical sectional view taken along the plane indicated by the line 10—10 of Figure 1, and shows the automatic reversing switch.
Figure 11 is a fragmentary plan view of a portion of the automatic reversing mechanism.

Turning now to Figure 3, it will be seen that plate 46, together with intermediate discs 44 and 45, is yieldingly held at the extreme right end of its lateral movement by spring 55, which is secured to bracket 56 mounted on lower deck 38. Intermediate shafts 22 and 35 is a shifting element 57 secured to plate 46 by bolt 58 and nut 59. Operatively associated with element 57 is a crank-arm 60 secured at its upper end to control shaft 61 (see Figure 4). Control shaft 61 is supported by brackets 62 and 63 secured to upper deck 15 by bolts 64 and nuts 65. Shaft 61 is adapted to be rotated through an arc by operating lever 66 having handle 67. It will be seen that rotation of control shaft 61 will cause an angular movement of crank-arm 60, and hence motion of plate 46 against the tension of spring 55. In Figure 11 it will be noted that operating lever 66 penetrates an aperture 68 in top deck 15, the aperture incorporating a rack having three steps—69, 70 and 71. Operating lever 66 is sprung so as to be normally maintained in engagement with one of the steps, which are so spaced that when the lever 66 is in engagement with the center step 70, neither of the intermediate drive discs 44 or 45 is in contact with drive disc 40, with the result that the turntable 16 rotates freely and the tape drive mechanism remains at rest. The other two steps correspond to the two operative positions of the tape-driving mechanism, step 71 corresponding to the position of the drive members in which capstan 29 rotates in a clockwise direction.

Figure 6:
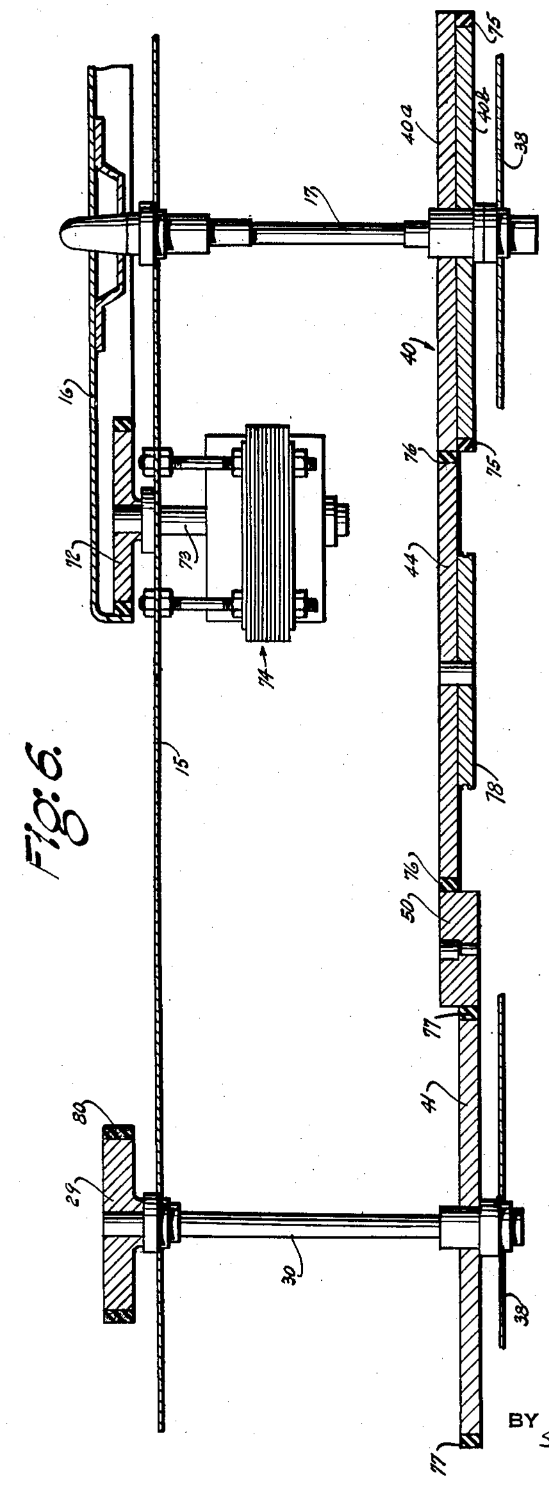
Figure 6 is a broken sectional view taken along the line 6—6 in Figure 2, through the points of tangency of the members comprising the reverse drive train.
Figure 7:
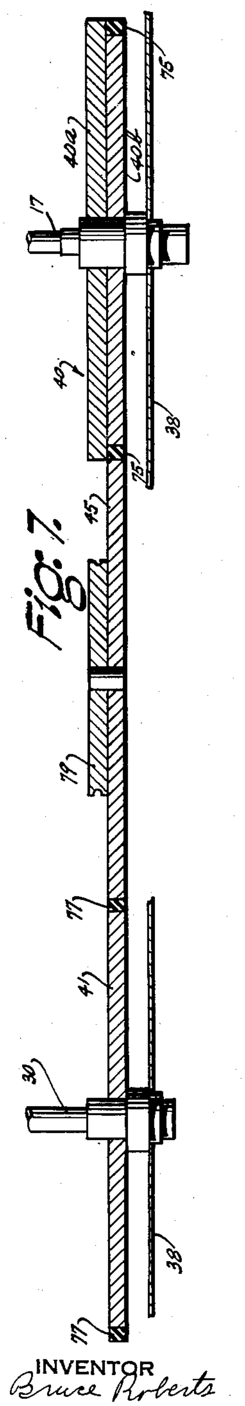
Figure 7 is a similar sectional view taken along the line 7—7 in Figure 2, showing the forward motion drive train.

Figures 6 and 7 represent broken sections taken through the points of contact of the drive train, Figure 6 representing the drive from disc 40 through disc 44 and idler 50, to driven disc 41, and hence depicting the condition of the parts when operating lever 66 is in engagement with step 69. Figure 7, on the other hand, represents the drive from disc 40 through disc 45 to disc 41, and therefore represents the condition when operating lever 66 is in engagement with step 71.

It should be noted that the drive train throughout involves the peripheral engagement of a metal surface against a rubber surface. For example, in Figure 6, rubber rimmed puck 72, mounted on shaft 73 of phonograph motor 74, engages the metal rim of turntable 16. Disc 40 is composite, the upper portion 40*a* being all metal, and the lower portion 40*b* being provided with a friction tire 75. Disc 44 is also provided with a tire 76, arranged to contact upper section 40*a* of disc 40. Pulley 50 is entirely metallic and is driven by tire 76 and drives tire 77 on disc 41.

Turning to Figure 7, it will be seen that pulley 45 is all metal and bears against tire 75 on disc 40. Disc 41, as has been stated above, is provided with a tire 77. Thus, the power train in either position involves rubber against metal contacts throughout.

It will also be noted in Figures 6 and 7 that discs 44 and 45 have mounted concentrically therewith pulleys 78 and 79 respectively, and that the arrangement of the disc 44 and pulley 78 is inverted as compared with disc 45 and pulley 79 in order to maintain the rubber to metal contact throughout each of the drive trains.

Although the absolute size of discs 40, 41, 44 and 45 is not significant in determining the ratio of speeds of the drive and the tape-translating mechanism, this ratio being determined rather by their relative sizes, I have found that irregularities in the dimensions of the drive discs tend to induce irregularities of tape-translating speed with concomitant distortion of the recorded signal. Within reasonable limits, a large disc and a small disc can be manufactured to approximately the same absolute tolerances and, accordingly, I prefer to use relatively large discs, since the same absolute variation in dimensions in a large disc produces a smaller variation in speed than the same absolute variation in dimensions will produce when small discs are employed.

Finally, in conjunction with the driving arrangements, it will be noted that capstan 29 is also provided with a tire of material having a high coefficient of friction as represented at 80.

According to the invention, the coefficient of friction between pulleys 78 and 79 and belts 47 and 52 is lower than the coefficient of friction between tape 21 and the tire 80 on capstan 29. As a result, the speed of the tape is determined solely by the speed of capstan 29, the ratio of the drive to the tape reel being such that the theoretical winding speed is always greater than the capstan speed. This results in a tensioning of the tape between the capstan and the winding reel, and the differential between the coefficients of friction mentioned above prevents this tension from increasing to the point where damage to the tape might result.

From the above it will be understood, therefore, that I have provided means for propelling the tape from one reel around the capstan, past the recording head, and onto the other reel, and means for reversing the direction of the tape.

Figure 8:
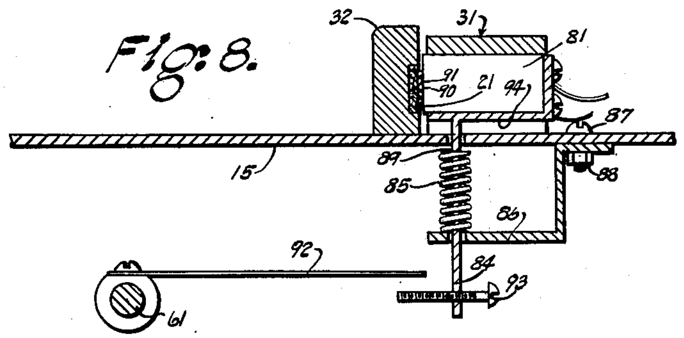
Figure 8 is a vertical sectional view taken in the plane indicated by the line 8—8 in Figure 1 and showing the means for reorienting the recording head in relation to the tape.

Turning now to the means for shifting the recording head, it will be seen in Figure 8 that recording head 81 is mounted in housing 31 for vertical displacement relative to tape 21 by means of head-actuating post 84. The specific construction of recording head 81 is not disclosed, the design of this head being no part of the present invention. It should be understood, however, that the invention contemplates the employment of a magnetic recording head of the type which is capable of functioning both to record and to reproduce intelligence, and that whenever the term "recording head" is used in the specification and claims, it refers to a head capable of performing both of these functions. Head 81 is yieldingly held at its extreme upper position by means of spring 85, which abuts at its lower end against bracket 86 which is secured to top deck 15 by bolt 87 and nut 88, and at its upper end against shoulder 89 on head-actuating post 84 (see Figure 4). Thus, when spring 85 is extended, pole pieces 90 and 91 scan tape 21 along a path in the upper half of the tape. However, when control shaft 61 is rotated in a clockwise direction by moving handle 67 into engagement with step 71, head crank 92 strikes bolt 93, pulling down post 84 and compressing spring 85 until the bottom surface 94 of head 81 comes in contact with top deck 15, at which time pole pieces 90 and 91 scan a path in the bottom half of tape 21. Thus, when reversing control 67 is moved manually from step 69 to step 71, reversing the direction of tape drive, head 81 is shifted from a track in the upper half of tape 21 to a track in the lower half of tape 21.

In Figure 11 will be seen, in dotted outline, a solenoid 95 operatively associated with a lever 96 pivoted to top deck 15 at 97. When solenoid 95 is energized, portion 98 of lever 96 is drawn toward the solenoid and portion 99 (see Figure 4) strikes operating lever 66, forcing it out of step 71 and permitting the whole reversing mechanism to be drawn to the opposite position by spring 55.

Solenoid 95 is controlled by switch 100 (see Figure 10), which switch comprises spring leaf 101 supported by bracket 102 from top deck 15 and contact 103 set into metallic support element 28 which is grounded to top deck 15. Spring leaf 101 is provided with a composite contact comprising contact member 128 and guide member 129. When the tape is dropped vertically between housing 27 and housing 28, member 129 deflects the bottom edge of the tape around the end of contact 128. Contact 128 and contact 103 are normally separated by tape 21. Switch 100, therefore, is adapted to energize solenoid 95 whenever a perforation in the tape permits contact 128 to engage contact 103.

Such perforations may be made in tape 21 at will by means of punch 24. The tape is continuously fed through punch 24 and it is only necessary to operate plunger 25 to create a suitable perforation in tap 21.

Switch 105 (see Figure 9) is adapted to be maintained in closed position by the presence of tape 21 between spring 106 and housing 28. It will be noted that housing 28 is recessed opposite spring leaf 106, allowing for a range of movement of leaf 106 considerably greater than the thickness of tape 21, and thus insuring positive operation of the switch. This switch controls the supply of current to motor 74. When the end of the tape 21 passes through switch 105, permitting spring 106 to move contact 107 from engagement with contact 108, the current supply to motor 74 will be interrupted and the entire mechanism will come to rest.

In addition to automatic switch 105, I have provided a manual switch 112 (see Figure 4), which is controlled by movement of tape latch 32. As may be seen in the figure, tape latch 32 is mounted for swing motion with a pin 114, which penetrates top deck 15. Secured to the lower end of the pin is an eccentric 115 which is arranged to drive switch 112 through dielectric element 116. Switch 112 is a leaf switch similar to switch 105, as shown in Figure 9. The profile of cam 115 is such as to close the contacts of switch 112 when tape latch 32 is in position to maintain the tape against the face of recording head 81, and to permit the switch to open when the latch is swung out of engagement with the tape. Spring leaf 117 of switch 112 performs the dual function of separating the contacts of the switch and of maintaining the tape latch in either the closed or open position, by virtue of the fact that cam 115 is provided with two low segments separated by a rounded high segment.

Figure 12:
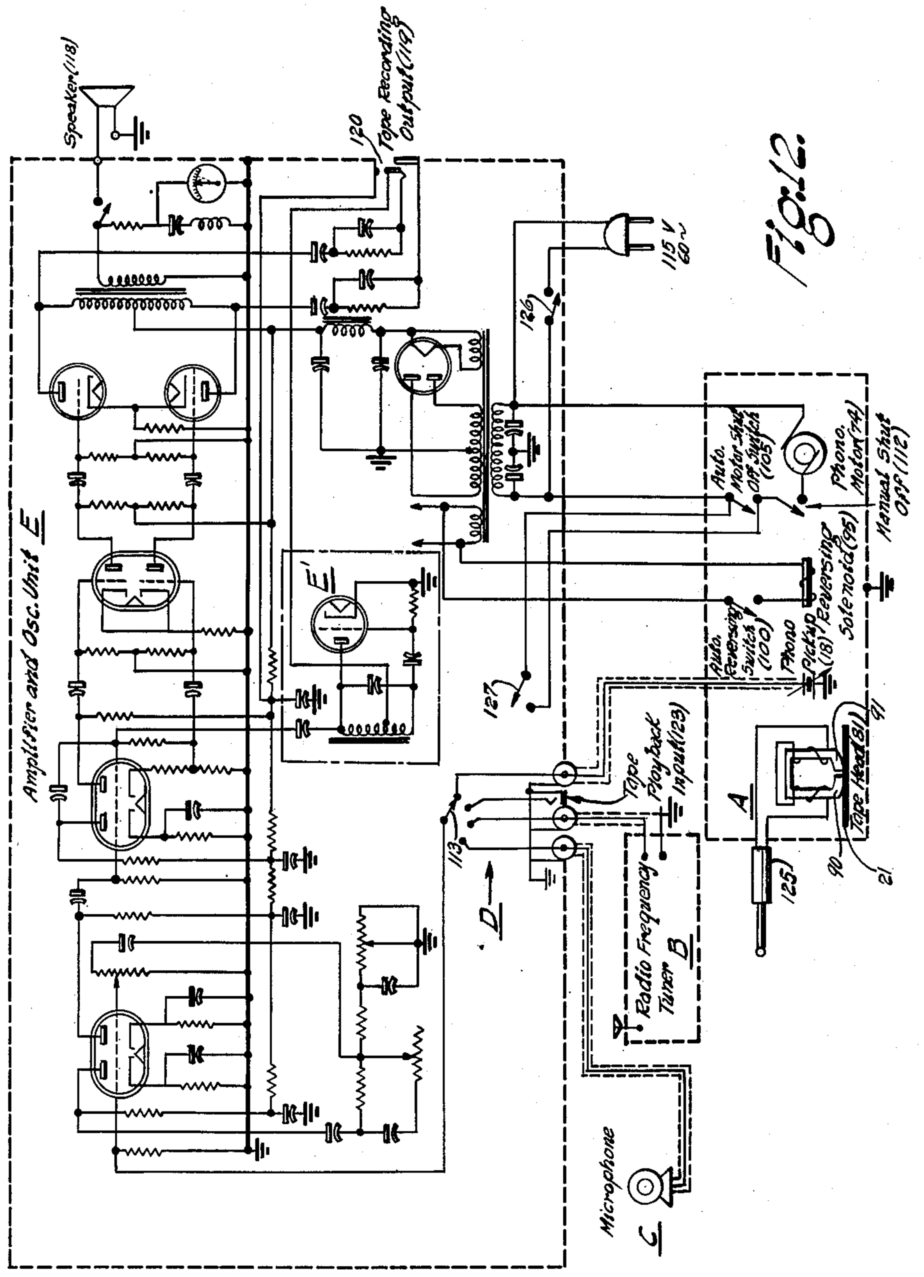
Figure 12 is a diagram showing the electrical connections between the parts of the present invention and other devices operatively associated therewith.

Figure 12 is a schematic diagram of one arrangement of the elements of the invention, in which block A represents the mechanism of Figures 1–11; blocks B and C represent a radio frequency tuner and microphone, respectively; and D represents switch means, including a switch 113, for connecting alternatively the outputs of the magnetic recording head, the phonograph pickup, the tuner, or the microphone to the input of a suitable amplifier, such as the one schematically indicated at E. Operatively associated with the amplifier is an oscillator circuit E′ for providing tape recording bias. In addition, the normal output of amplifier E is shown as connected to a loudspeaker 118, and the recording output is connected to a jack 119. This jack includes a switch 120 for controlling oscillator E′, whereby the oscillator is rendered inoperative except when the apparatus is adjusted for recording on magnetic tape.

The adjustment of the apparatus to make a tape recording, for example, from a disc recording will now be described. Main power switch 126 is closed, switch D is set to connect the amplifier input to phonograph pick up 18, plug 125 is inserted in tape record output jack 119, actuating switch 120 and thereby energizing oscillator E′. A phonograph record is placed on turntable 16, and a reel 20 of unrecorded tape is placed on the machine and the tape threaded as described above, around pulley 23, through punch 24, between switch housings 27 and 28, around capstan 29, between head housing 31 and tape latch 32, around pulley 33 and onto reel 34. Manual control handle 67 is thrown to the extreme right into engagement with step 71, phonograph motor switch 127 is opened and the motor energized by tape latch switch 112 (see Figure 12). Pick up 18 is now lowered onto the record. If both sides of a disc recording are to be recorded on tape, when the first side has been recorded, switch 112 is opened, punch button 25 is depressed momentarily to perforate the tape, and operating handle 67 is thrown to the extreme left into engagement with step 69. This simultaneously effects the reversal of the tape drive mechanism and shifts the recording head to the upper track on tape 21. The disc record is inverted, power switch 112 is energized, and recording resumed. When the second side of the disc has been fully recorded, tape 21 will be fully wound on reel 20 and in position to be reproduced.

It should be understood that when making tape recordings from a series of disc recordings or from the radio tuner or microphone, the duration of the completed recording is estimated in advance, and the reversing operations are performed when half of the estimated time has elapsed, in order to insure that the two recording tracks on the tape are of substantially equal length. For example, if a symphony comprising twelve sides on disc records is to be transferred to a tape recording, the mechanism will be reversed after six of the sides have been transferred with the tape mechanism running in one direction. If a radio program of known length, for example, thirty minutes, is to be recorded, the reversing operation will be scheduled to occur at the conclusion of the first fifteen minutes.

To reproduce a tape recording made in accordance with any of the procedures outlined above, plug 125 is removed from tape recording output jack 119 (de-energizing oscillator E′) and inserted in jack 123. Switch D is then actuated to connect jack 123 to the input of amplifier E. Reproduction of the entire recording is automatic, the operation of the equipment being as follows: When the motor is energized, tape feeds from reel 20 through the drive mechanism and recording head onto reel 34, as described above. When the perforation made by perforator 24 passes through switch 100, solenoid 95 is energized, attracting end 98 of lever 96 and forcing operating lever 66 out of engagement with slot 71. Spring 55 now effects the reversal of the drive mechanism and the shifting of the recording head 81 to the upper track in the manner described above. The tape is now fed in the reverse direction until the reproduction of the recording has been completed, and the end of the tape passes through switch 105, separating contacts 107 and 108, and breaking the circuit to motor 74, at which time the recorded tape is again fully wound on reel 20 in position to be removed for storage or again reproduced.

As will be readily apparent, phonograph records may be reproduced directly by operating the equipment as above described, except that the output of the amplifier is connected only to the loudspeaker and control handle 67 is placed in the neutral position. In addition, if no tape is in the machine during reproduction of phonograph records, phonograph switch 127 must be closed, short circuiting automatic switch 105 in order to establish the path to phonograph motor 74. Similarly, the output of the tuner and microphone may be reproduced directly by adjusting switch D to the appropriate position.

I claim:

1. In combination, a deck, a phonograph turntable of smaller diameter than that of disc recordings to be played thereon and a reversible magnetic tape-propelling capstan both mounted above the deck and disposed with their rotational axes spaced apart in a vertical plane, a tape storage reel above the deck and disposed on one side of said plane, a temporary tape reel above the deck and disposed on the other side of said plane, said capstan and portions of said reels being offset from the center of said turntable by a distance greater than the radius of said turntable but less than the radius of a disc recording, and said reels and said capstan being located below the horizontal plane of the top surface of said turntable.

2. In combination with mechanism for translating a magnetic tape recording in a path, magnetic transducer and tape marking means both in juxtaposition to the path, and means also in juxtaposition to the tape path and responsive to marks made by said marking means to control the operation of the transducer in relation to the tape, said marking means and said responsive means being spaced from each other along the tape path.

3. A combination in accordance with claim 2 and further including mechanism controlled by said control means for reversing said translating mechanism.

4. For a magnetic tape translating device, tape propelling mechanism, a driven member associated therewith, a drive member, a disengageable forward motion drive for interconnecting said members, a disengageable reverse motion drive for interconnecting said members, and control means for selectively engaging said drives, said control means being capable of establishing three conditions: first, said forward motion drive engaged; second, said reverse motion drive engaged; and, third, neither of said drives engaged; a control capable of assuming three positions corresponding to the three said conditions, means for retaining the said control in each of the said positions, and electrically controlled means responsive to indicia on a magnetic tape for shifting said control from the third position to the first position.

5. For a magnetic recording machine having tape-translating means, a magnetic recording head mounted in juxtaposition to one surface of a tape, a control switch for energizing and de-energizing the recording machine, and a tape latch mounted for swing motion from a first position in which said latch is adapted to bias a tape against the recording face of said head, to a second position in which said latch is relatively remote from said face, said latch being provided with means arranged to maintain said latch in either position, said latch further constituting an operating element for said switch, said switch providing for energizing of the recording machine when the latch is in said first position and for de-energizing the machine when the latch is in said second position.

6. In a magnetic tape recording device, means for translating a magnetic tape in a path, drive means for said translating means, a magnetic recording head in juxtaposition to said path at one side thereof, a control switch for said drive means comprising a control member, means for maintaining said switch in both closed and open position, said control member being mounted for swing motion toward and away from the tape path in a region opposite the recording head and serving to maintain a tape in position against the recording head when the switch is closed, and being clear of the tape when the switch is open.

7. Magnetic recording and reproducing apparatus comprising reversible tape translating mechanism and magnetic transducer means shiftable from a first influencing relationship with a tape to another such relationship, a control for concurrently reversing said mechanism and shifting said transducer means from one such relationship to another, a marking device mounted in juxtaposition to the path of the tape translated by said mechanism and adapted to produce a mark on a tape, and a mark responsive device also mounted in juxtaposition to the path of the tape but spaced from the marking device, said control being adapted to be actuated by actuation of the mark responsive device to reverse said mechanism and shift said transducer means.

8. In a machine for use with magnetic tape records, comprising in combination with a pair of reels between which a tape record is adapted to be fed, a rotative tape translating element adapted to engage a tape in its path between said reels, a driven wheel rotative with said element, and drive mechanism for said wheel comprising a first rotative member adapted to engage and rotate said wheel in one direction, and a second such member adapted to engage said wheel and rotate the same in the opposite direction, said members and said wheel all lying in a common plane and having peripheral friction driving surfaces.

9. In a machine for use with magnetic tape records, comprising in combination with a pair of reels between which a tape record is adapted to be fed, a rotative tape translating element adapted to engage a tape in its path between said reels, a driven wheel rotative with said element, drive mechanism for said wheel comprising a first rotative member adapted to engage and rotate said wheel in one direction and a second such member adapted to engage said wheel and rotate the same in the opposite direction, driving parts of said drive mechanism being shiftable to activate one or the other of said rotative members, and control means comprising a solenoid for shifting said driving parts in one direction and a spring for shifting said driving parts in the other direction.

10. A construction in accordance with claim 9 and further including a releasable latch device for restraining the action of said spring, and means actuated toward the end of a tape run to trip said latch device.

11. For a magnetic tape translating device, tape propelling mechanism, a driven member associated therewith, a drive member, a disengageable forward motion drive for interconnecting said members, a disengageable reverse motion drive interconnecting said members, and control means for selectively engaging said drives, said control means being capable of establishing two conditions: first, said forward motion drive engaged; second, said reverse motion drive engaged; a control capable of assuming two positions corresponding to the two said conditions, means for retaining said control in each of the said positions, and electrically controlled means responsive to indicia on a magnetic tape for shifting said control from one of said positions to the other.

12. Magnetic tape recording apparatus comprising tape propelling mechanism including a driving motor, means defining a tape path, a magnetic head adapted to engage a tape propelled by said mechanism, means for bringing the head into engagement with the tape, including a displaceable control member, and control means for said motor operatively coordinated with said displaceable control member and providing for start of the motor when the control member is moved to effect engagement of the head with the tape and for stop of the motor when the control member is moved in the other direction.

13. Equipment for use with elongated magnetic tape records comprising a horizontal top deck, a pair of reel mounting spindles projecting above the deck and adapted to mount a pair of reels in a common plane close to the deck but spaced from each other, and tape guiding, scanning and feeding mechanism establishing a tape feed path between the reels a portion of which is U-shaped and lies in the space between the reels, said mechanism including a tape driving capstan at the base of said U-shaped portion of the feed path to establish frictional engagement with a tape record throughout substantially half the circumference of the capstan, drive mechanism for the reels and capstan located below the deck and including separate driving connections extended upwardly through the deck for each of the reels and for the capstan, and a magnetic reproducing head positioned along the feed path between said capstan and one of the reels, and said guiding, scanning and feeding mechanism projecting above the deck into the plane of the reels and providing a tape feed path upwardly open for threading of a tape into said feed path edgewise from above.

14. A machine for use with magnetic tape records, comprising a magnetic scanning head including a tape engaging pole, reversible mechanism for transporting a tape record in either direction in engagement with said pole of the scanning head, a mounting for the head providing for shifting movement of said pole from one scanning track to an adjacent scanning track, the head being biased for movement in one direction from a first track to a second track, means for holding the head with said pole in registry with the first track, a trip mechanism providing automatically for release of the holding means and thus for shift of said pole from the first track to the second track upon reversal of the tape transporting mechanism, and a manually operable handle for shifting the head in the opposite direction.

15. A machine for use with magnetic tape records, comprising a magnetic scanning head having pole pieces for scanning a record, reversible mechanism for transporting a tape record in either direction in engagement with said pole pieces to effect record scanning by the same pole pieces in both directions of transport of the record, a mounting for the head providing for shifting movement of said pole pieces from one scanning track to another, said head mounting including guide means providing for substantially direct shift of the pole pieces transversely of the tape from one scanning track to another without disengagement from the tape, the head being biased for movement in one direction to move said pole pieces from a first track to a second track, means for holding the head in position with its pole pieces in registry with the first track, a trip mechanism providing for release of the holding means and thus for shift of the head and its pole pieces from the first track to the second track upon reversal of the tape transporting mechanism, and a manually operable handle for shifting the head in the opposite direction.

16. For a magnetic tape record translating device, tape propelling mechanism, a driven member associated therewith, a forward motion drive for driving said driven member in one direction, a reverse motion drive for driving said driven member in the opposite direction, and control means for selectively engaging said drives, said control means comprising a control member movable to three positions to establish three conditions: first, said forward motion drive engaged; second, said reverse drive engaged; and third, an intermediate position in which neither of said drives are engaged, means for retaining the said control member in each of said three positions, and means responsive to indicia on a tape record for shifting said control from the third position through the intermediate position to the first position.

BRUCE ROBERTS.

REFERENCES CITED

The following references are of record in the file of this patent:

UNITED STATES PATENTS

| Number | Name | Date |
|---|---|---|
| 262,566 | Briggs | Aug. 15, 1882 |
| 737,998 | Butler | Sept. 1, 1903 |
| 1,195,082 | Player et al. | Aug. 15, 1916 |
| 1,239,401 | Kelly | Sept. 4, 1917 |
| 1,399,329 | Vandercook | Dec. 6, 1921 |
| 1,543,867 | Page | June 30, 1925 |
| 1,563,382 | Legg | Dec. 1, 1925 |
| 1,758,559 | Croll | May 13, 1930 |
| 1,789,607 | Steurer | Jan. 20, 1931 |
| 1,827,588 | Kellogg | Oct. 13, 1931 |
| 1,892,855 | Scheibell | Jan. 3, 1933 |

(Other references on following page)

UNITED STATES PATENTS

| Number | Name | Date |
|---|---|---|
| 1,930,544 | Victor | Oct. 17, 1933 |
| 1,946,604 | Wittel | Feb. 13, 1934 |
| 1,952,809 | Kuchenmeister | Mar. 27, 1934 |
| 2,005,596 | Scheibell | June 18, 1935 |
| 2,029,730 | Mallina | Feb. 4, 1936 |
| 2,069,631 | Thomas | Feb. 2, 1937 |
| 2,086,130 | Hickman et al. | July 6, 1937 |
| 2,096,019 | Adair | Oct. 19, 1937 |
| 2,096,805 | Hickman | Oct. 26, 1937 |
| 2,181,318 | Fessenden | Nov. 28, 1939 |
| 2,200,574 | Davis | May 14, 1940 |
| 2,225,323 | Severy | Dec. 17, 1940 |
| 2,275,961 | Heller | Mar. 10, 1942 |
| 2,296,845 | Goetz | Sept. 29, 1942 |
| 2,328,539 | Greenleaf et al. | Sept. 7, 1943 |
| 2,333,235 | Clausen | Nov. 2, 1943 |
| 2,351,005 | Camras | June 13, 1944 |
| 2,372,810 | Camras | Apr. 3, 1945 |
| 2,418,543 | Camras | Apr. 8, 1947 |
| 2,430,538 | Somers | Nov. 11, 1947 |
| 2,514,578 | Heller et al. | July 11, 1950 |
| 2,535,486 | Dank | Dec. 26, 1950 |

FOREIGN PATENTS

| Number | Country | Date |
|---|---|---|
| 390,878 | Germany | Feb. 25, 1924 |
| 408,973 | Germany | Jan. 27, 1925 |